United States Patent [19]
McIntyre, Jr. et al.

[11] Patent Number: 5,813,041
[45] Date of Patent: Sep. 22, 1998

[54] METHOD FOR ACCESSING MEMORY BY ACTIVATING A PROGRAMMABLE CHIP SELECT SIGNAL

[75] Inventors: Kenneth L. McIntyre, Jr., Dripping Springs; Anthony M. Reipold, Austin; Daniel W. Pechonis, Austin; Steven P. Lindquist, Austin, all of Tex.

[73] Assignee: Motorola, Inc., Schaumburg, Ill.

[21] Appl. No.: 660,028

[22] Filed: Jun. 6, 1996

[51] Int. Cl.[6] .............................. G06F 12/00; G11C 8/00
[52] U.S. Cl. ........................... 711/167; 365/233; 395/855
[58] Field of Search ....................... 711/1, 167; 365/233; 395/855, 586, 587

[56] References Cited

U.S. PATENT DOCUMENTS 4,816,997  3/1989  Scales, III et al. .................... 395/290
5,151,986  9/1992  Langan et al. ........................ 395/281
5,448,744  9/1995  Eifert et al. .......................... 395/800.4
5,502,835  3/1996  Le et al. .............................. 711/169

Primary Examiner—Reginald G. Bragdon

[57] ABSTRACT

A data processing system (20) having a high performance chip select (HPCE) signal, which is functionally programmable to remain asserted for a predetermined number of bus cycles based on an access duty cycle. Bits in an option register (52) allow the user to program HPCE for maintained assertion always, never, or for a number of cycles after a last valid address match. Continued assertion reduces access time to an external device allowing the user to determine the trade-off between high speed access and low power consumption. Additionally, a speculative burst access is made without regard to match criteria, allowing a device to prepare for access while data processor (22) determines the next device to access. Here a load burst address (LBA) signal is speculatively provided to an activated device, and where the next access is to another device, the speculative access is aborted.

20 Claims, 6 Drawing Sheets

METHOD FOR ACCESSING MEMORY BY ACTIVATING A PROGRAMMABLE CHIP SELECT SIGNAL

CROSS-REFERENCE TO RELATED, COPENDING APPLICATIONS

The present application is related to the following copending U.S. patent applications: "Method and Apparatus for Programmable Chip Select Negation in a Data Processing System", invented by Kenneth L. McIntyre Jr., et al., having application Ser. No. 08/660,620, filed Jun. 6, 1996, and assigned to the assignee hereof;

"Method and Apparatus for Adaptable Burst Chip Select in a Data Processing System", invented by Kenneth L. McIntyre Jr., et al., having application Ser. No. 08/660,702, filed Jun. 6, 1996, and assigned to the assignee hereof;

"Method and Apparatus in a Data Processing System for Using Chip Selects to Perform a Memory Management Function", invented by Wendy Reed, having application Ser. No. 08/608,388, filed Feb. 28, 1996, and assigned to the assignee hereof.

FIELD OF THE INVENTION

The present invention relates in general to a data processing system, and more particularly to a chip select logic circuit for integrated circuit microprocessors and microcomputers.

BACKGROUND OF THE INVENTION

Integrated circuit microprocessors must, in many cases, be connected with other integrated circuit devices in order to provide certain functions. Typically, a designer of a system using a microprocessor and other integrated circuits will use "glue logic" to generate the required chip select signals from the address and bus control signals produced by the microprocessor itself. This extra logic adds significantly to the cost of the system being designed and may degrade performance, and therefore is highly undesirable.

The 80186 (also referred to as the iAPX 186), available from the Intel Corporation of Santa Clara, Calif., is an integrated circuit microprocessor which has internal logic for generating chip select signals. The chip select logic has limited ability to program the address range for which each of the seven possible chip selects is active and can programmably insert wait states into the bus cycles for which each chip select is active.

Another example of an integrated circuit microprocessor with on-board chip select logic is that disclosed by John A. Langan and James M. Sibigtroth in U.S. Pat. No. 5,151,986, issued Sep. 29, 1992. The disclosed chip select logic includes a control register by means of which the timing, polarity and number of wait states can be individually programmed for each of several chip select outputs.

An integrated circuit microprocessor with a highly flexible on-board chip select logic is taught by James B. Eifert et al. in U.S. Pat. No. 5,448,744, issued Sep. 5, 1995. The chip select logic taught by Effert et al. provides a great deal of flexibility by allowing the chip select signal to be activated conditionally based on whether an attribute of an access cycle, such as whether the cycle is a read or a write cycle, matches a programmable attribute.

A major problem associated with the integration of chip select logic onto a microprocessor integrated circuit involves the competing requirements of low power consumption in the data processing system and high speed peripheral access. Typical chip selection methods require some address decoding as well as attribute or option matching. In order to minimize power consumption, a complete address and option match is performed prior to enabling the peripheral device chip enable or chip select, which is herein referred to as "CE".

Bus cycles required to affect chip selection, such as the cycles to decode address and to match option information, reduce the cycles available for device access. One method of increasing access speed is to continuously assert a device chip select (CE) removing the address decode and CE assertion time from the total access time. However, the continual assertion of CE results in increased power consumption and fails to extend to a broad range of device types.

Also, frequently accessed devices continue to expend bus cycles to match address information and to assert CE. Similarly, devices that are accessed infrequently remain enabled consuming power. It is desirable to increase the number of cycles available for device access, while at the same time reducing the power consumption of the data processing system. A flexible solution will apply to a variety of devices, such as memory devices with internal address generation, pipeline burst FLASH memory devices, and asynchronous memory devices.

SUMMARY OF THE INVENTION

A data processing system includes a high performance chip select (HPCE) signal, which is functionally programmable to remain asserted for a predetermined number of bus cycles based on an access duty cycle. Bits in an option register allow the user to program the HPCE to remain asserted always, never, or for a number of cycles after a last valid address match. Continued assertion reduces the access time to an external device allowing the user to determine the trade-off between high speed access and low power consumption. Additionally, a speculative burst access is made with regard to match criteria, allowing a device to prepare for access while a data processor determines the next device to access. A load burst address (LBA) signal is speculatively provided to an activated device, and where the next access is to another device, the speculative access is aborted.

DETAILED DESCRIPTION OF A PREFERRED EMBODIMENT

Figure 1:
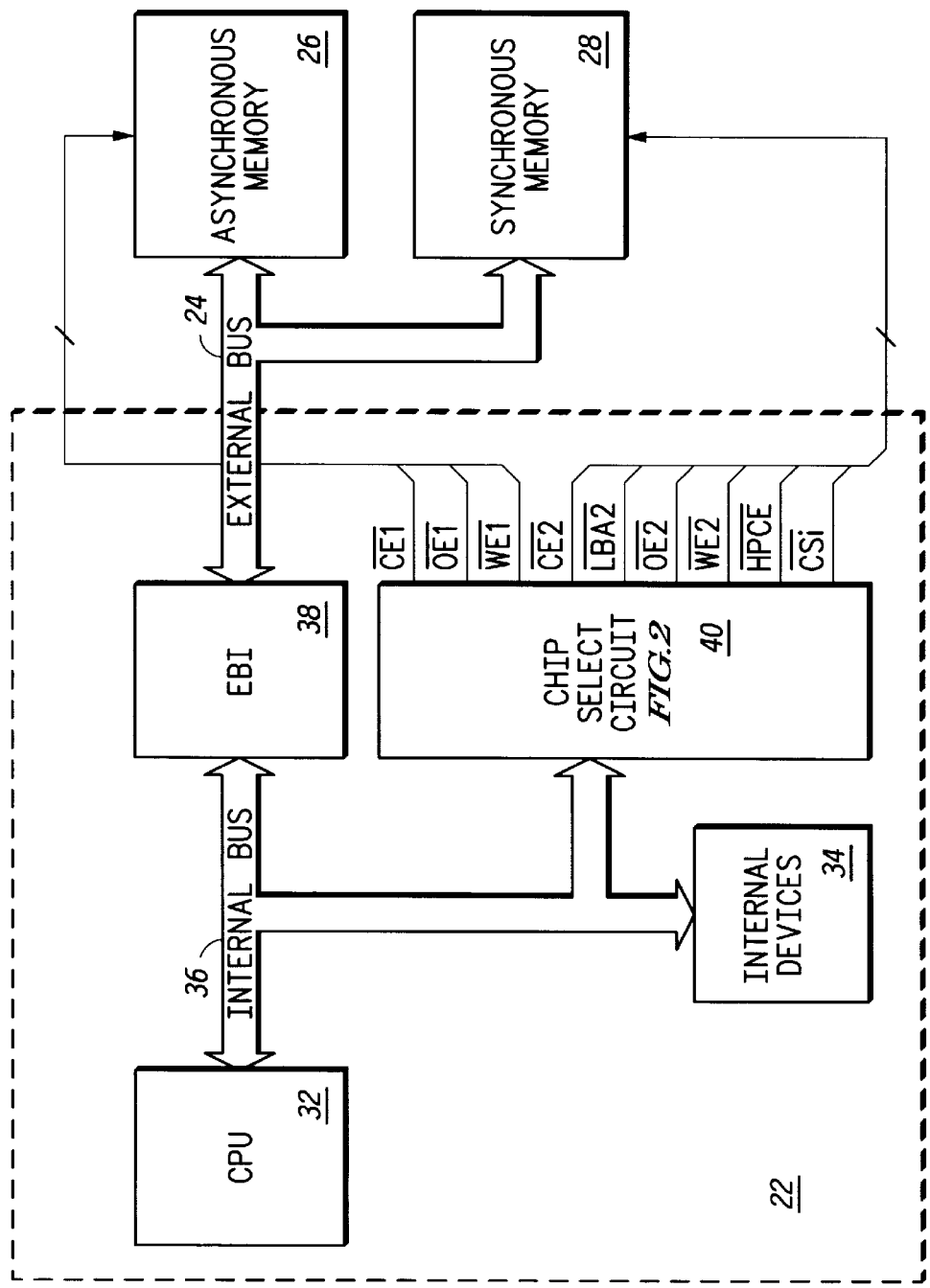
FIG. 1 illustrates in block diagram form a data processing system according to the present invention.

According to the present invention, a data processing system has a burst chip select module which addresses the competing interests of high speed memory access and low power consumption performance. According to one aspect of the invention, the chip select circuit allows the user to decide on a power/performance ratio for a particular application.

A high performance chip enable (HPCE) signal is functionally programmable to remain asserted for a predetermined number of bus cycles after the last valid device access based on an access duty cycle. The access duty cycle considers the potential number of accesses to a particular device. Asserting HPCE without matching on every access removes clock cycles associated with address decode and chip selection assertion and thus increases the speed of access to a device. In one example, HPCE remains asserted always, never, four cycles after a valid address match, or eight cycles after a valid match.

Additionally, to increase access speed further, a speculative access is begun without regard to any match criteria. Here when a device is activated for access the burst chip select initiates a memory access by asserting a load burst address (LBA) signal before receiving access validation. The speculative access allows the device to prepare for access while the data processing system determines which device to access. Where the next access is to another device, the speculative access is aborted. There is no backing out steps required for the data processing system, as there was no actual access but merely device preparation.

Another aspect of the present invention allows for a programmable chip select negation. In one embodiment, a chip select signal may be negated one bus cycle prior to assertion of a data acknowledge signal giving slower memories additional time to deactivate. The early negation of a chip select signal provides an efficient method of interface with devices having synchronous output enable requirements and provides additional bus decoupling time.

According to another aspect of the present invention, a burst address generator (BAG) module has a programmable transfer mode applicable to both cache type architecture and pre-fetch type architecture. The dual application ability adds a level of flexibility to system design. The BAG terminates a bus cycle with a data acknowledge signal upon a programmable termination condition corresponding to the type of transfer. The termination condition may be a predetermined number of data transfers (e.g. $2^N$) or a physical boundary (e.g. $2^{(N)}-1$) and allows for access in the middle of a row of an external memory device. For cache type transfers, a burst counter determines when a cache line width limit is reached (i.e. cache line is full) and in response asserts a data acknowledge signal. The pre-fetch type architecture utilizes an address incrementor to detect the crossing of a row boundary and in response asserts a data acknowledge signal. In one embodiment, the burst address is provided externally for devices without address increment capability.

The present invention addresses the conflicting requirements of high speed access and low power consumption with a range of solutions and application. The present invention is a flexible approach to increasing the speed of device access while considering the process of system design.

General: In the following description, numerous specific details are set forth such as specific control register bit lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Terminology: The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The present invention can be more fully understood with reference to FIGS. 1–8. FIG. 1 illustrates in block diagram form a data processing system 20. Data processing system 20 includes generally a data processor 22 connected via an external bus 24 to an asynchronous memory 26 and a synchronous memory 28. In addition, data processor 22 includes chip select circuitry which provides three chip select signals to asynchronous memory 26 and four chip select signals to synchronous memory 28 which will be described in greater detail hereinafter.

Data processor 22 includes generally a central processing unit (CPU) 32 connected via an internal bus 36 to various other components of data processor 22. These other components include internal devices 34, an external bus interface (EBI) 38, and a chip select circuit 40. CPU 32 may use any conventional CPU architecture such as complex instruction set computer (CISC), reduced instruction set computer (RISC), digital signal processor (DSP), or any other known architecture. Internal devices 34 represent additional functions such as input/output peripherals, interrupt controllers, timers, and the like. EBI 38 is adapted to couple address and data signals conducted on internal bus 36 to external bus 24 for the transmission of data to and from asynchronous memory 26, synchronous memory 28, and other devices which may be connected to external bus 24.

Chip select circuit 40 is an integrated chip select signal generator which is able to activate signals to drive actual physical memory chips. For example, chip select circuit 40 provides three signals for interfacing to asynchronous memory 26, designated "CE1", "OE1", and "WE1". These signals form the chip enable, output enable, and write enable inputs, respectively, of conventional integrated circuit memories. Chip select circuit 40 also is able to access synchronous memory devices and in order to access these devices, provides four signals labeled "CE2", "LBA2", "OE2", and "WE2". In addition to forming the conventional chip enable, output enable, and write enable inputs, respectively, of a memory integrated circuit, chip select circuit 40 also provides signal LBA2 which serves as a synchronous cycle start signal. In some cases, synchronous memory 28 will be a burstable memory device, in which case signal LBA2 will signal the start of a burst access. Note that chip select circuit 40 will generally provide additional chip select signals which are omitted from FIG. 1 in order to ease discussion of the present invention.

Figure 2:
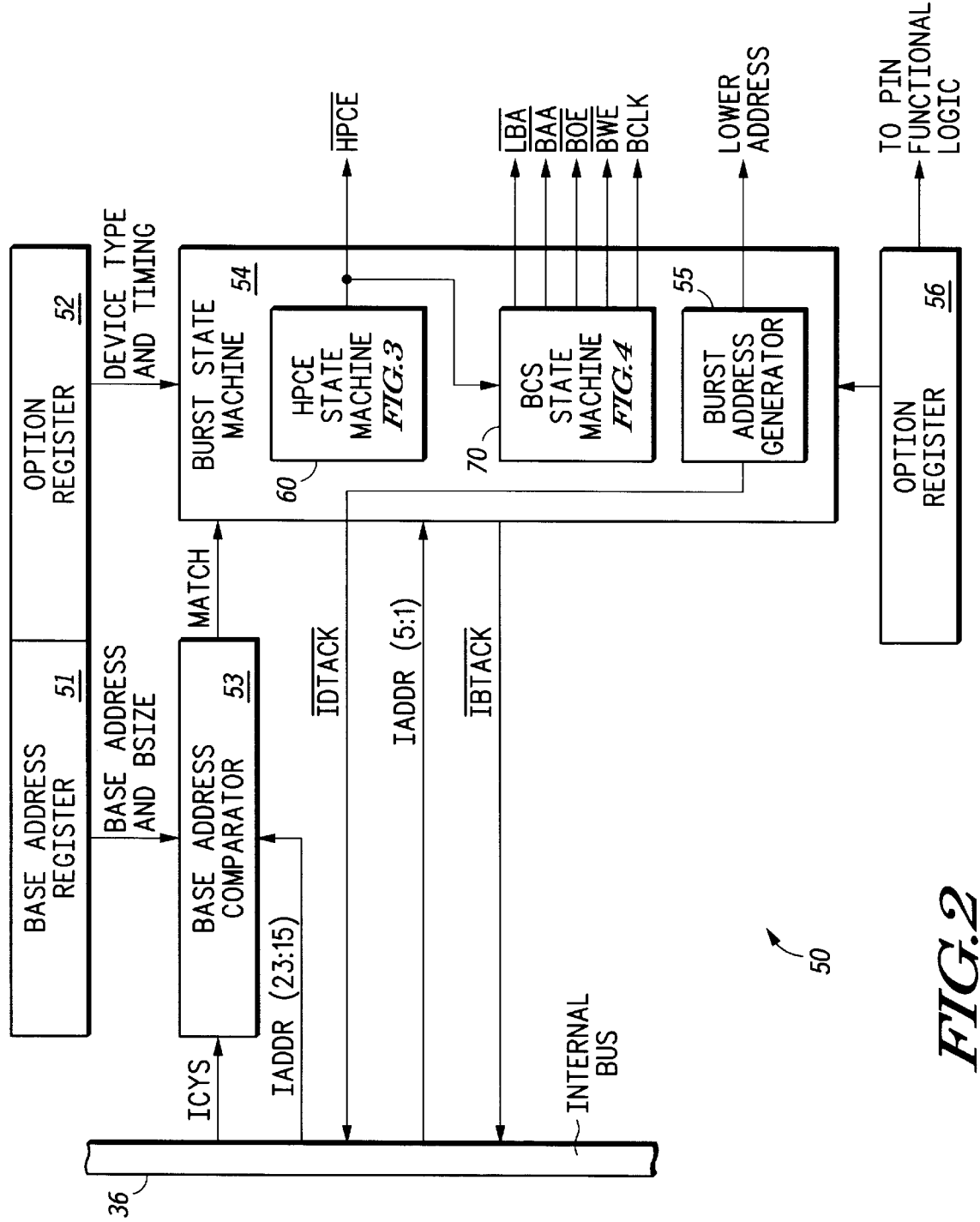
FIG. 2 illustrates in block diagram form a first portion of the chip select circuit of FIG. 1.

FIG. 2 illustrates in block diagram form a first portion 50 of chip select circuit 40 of FIG. 1. Portion 50 includes generally a base address register 51, an option register 52, a base address comparator 53, a burst state machine 54, and an option register 56. Base address register 51 stores bits representing a base address and size of the region associated with portion 50 and provides them as an input to base address comparator 53. Base address comparator 53 also has a second input for receiving critical bits of the address conducted on internal bus 36 labeled IADDR (23:15). Base address comparator 53 also has a control input for receiving a cycle start signal labeled "ICYS" also referred to as a device cycle start signal from internal bus 36. In response to the activation of signal ICYS, base address comparator 53 compares IADDR (23:15) to the base address from base address register 51. Base address comparator 53 activates an output signal labeled "MATCH" to indicate that the address represented by critical address bits IADDR (23:15) are within the range defined in base address register 51.

Option register 52 is a 16-bit register which includes several bits defining programmable characteristics associated with the region. The definition of these bits is illustrated in TABLE I below.

TABLE I

| Bit(s) | Name | Encoding |
|---|---|---|
| 2:0 | INITIAL TIMING | 000–111 = 0 through 7 |
| 3 | BURST DATA TIMING | 0 = no waits between burst data |
| | | 1 = 1 wait between burst data |
| 5:4 | DEVICE BOUNDARY | 00 = 4 |
| | | 01 = 8 |
| | | 10 = 16 |
| | | 11 = 32 |
| 7:6 | MEMORY TYPE | 00 = burst flash, and SRAM |
| | | 01 = undefined |
| | | 10 = pipeline flash |
| | | 11 = asynchronous SRAM and flash |
| 9:8 | HPCE | 00 = negate 4 bus cycles after last access |
| | | 01 = negate 8 bus cycles after last access |
| | | 10 = always negate after cycle |
| | | 11 = never negate |
| 10 | WRITE HOLD | 0 = negate BWE and $WE_{LO}$ in S5 |
| | | 1 = negate BWE and $WE_{LO}$ on clock before S5 |
| 11 | MSIZE | 0 = 16-bit |
| | | 1 = 8-bit |
| 12 | R/W | 0 = read only |
| | | 1 = read/write |
| 13 | SPACE | 0 = user space |
| | | 1 = supervisor/user |
| 15:14 | BURST RESPONSE | 00 = disable BCS |
| | | 01 = burst R/W operation |
| | | 10 = burst read/non-burst write operation |
| | | 1 = non-burst write operation |

Most bits of option register 52 perform conventional functions associated with chip select circuitry. However, the HPCE field allows users to selectively tailor their systems for an optimal tradeoff between lower power consumption and higher performance. The HPCE field determines the number of cycles which access another region for which burst state machine 54 keeps signal CE active. When the HPCE field is set to 00, burst state machine keeps signal CE active for four consecutive accesses to another region. At the start of a fifth consecutive access to another region, burst state machine deactivates signal CE. Also if an access to this region occurs before the start of the fifth access, then burst state machine 54 begins counting again from zero. An encoding of 01 is similar to an encoding of 00 except that burst state machine 54 keeps signal CE active for eight consecutive accesses to another region, and deactivates signal CE at the start of the ninth consecutive access to another region. An encoding of 10 causes burst state machine 54 to always inactivate signal CE at the end of a cycle, even if the next cycle is also to this region. Finally, an encoding of 11 cause burst state machine to keep signal CE active continuously after a first access to this region until the chip is reset.

The availability of the 00 and 01 encodings allows users to programmably configure chip select circuit 40 to make a tradeoff between low power and high performance which is optimal for the application. Factors which may affect the choice will include the average number of instructions in a loop, whether the region is a code or a data region, etc.

Burst state machine 54 is an access state machine which upon a match to the region associated with portion 50 generates chip select output signals. These chip select output signals include a chip enable signal labeled "HPCE", a burst address advance signal labeled "BAA", a burst write enable signal labeled "BWE", a load burst address signal labeled "LBA", an output enable signal labeled "BOE". In addition, BCS state machine 70 outputs a bus clock signal labeled "BCLK". In order to accomplish this function burst state machine 54 is connected to internal bus 36 and receives address signals IADDR(5:1) therefrom. In addition, burst state machine 54 provides two signals to internal bus 36 labeled "DTACK" and "BTACK" which inform CPU 32 of the termination of an access cycle, or a transfer of each word of the burst, respectively.

Burst state machine 54 includes two state machines which are important in understanding the present invention. The two state machines are the HPCE state machine 60 and the BCS state machine 70. HPCE state machine 60 is used to implement the chip enable mechanism according to the present invention wherein the chip enable signal may remain active between cycles to reduce access time and in which the user may selectively tradeoff power consumption and access time. In addition, BCS state machine 70 is used to provide signal LBA speculatively in response to the prediction made by HPCE state machine 60 of whether an access to the region is likely to be encountered based on its history.

Additionally contained in burst state machine 54 is a burst address generator (BAG) 55 which provides signal DTACK to internal bus 36 and generates burst address values forming the LOWER ADDRESS presented to external bus 24.

A second register, option register 56, is a 16-bit register which includes several bits defining programmable characteristics associated with burst chip select. Option register 56 provides burst chip select information to burst state machine 54 and to pin functional logic. The definition of these bits is illustrated in TABLE II below.

TABLE II

| Bit(s) | Name | Encoding |
|---|---|---|
| 7:0 | RESERVED | 0000 0000 |
| 8 | BCS TRIGGER | 0 = only on BCS match |
| | | 1 = on BCS match or on asynchronous chip select match |
| 9 | BAG MODE | 0 = Pre-fetch mode |
| | | 1 = Cache mode |
| 10 | LBA FUNCTION | 0 = as HPCE |
| | | 1 = as a memory strobe |
| 11 | BAA FUNCTION | 0 = as HPCE |
| | | 1 = as a memory strobe |
| 12–15 | RESERVED | 000 |

As with option register 52, most bits of option register 56 perform conventional functions associated with chip select circuitry. However, the BAG MODE field allows the user to select between cache type architecture and pre-fetch type architecture. Many data processing systems having more than one CPU combine a variety of architecture types. The user programs the BAG MODE field to select pre-fetch type or cache type depending on the internal architecture. When the BAG mode bit is cleared indicating pre-fetch type, Burst Address Generator (BAG) 55 terminates a bus cycle by asserting signal DTACK at a modulus boundary determined by the physical size of the memory device. Typically, the modulus boundary is a function of an incremented address. When the BAG MODE bit is set indicating cache type, BAG 55 terminates a bus cycle by asserting signal DTACK after a predetermined number of data transfers. Typically the predetermined number is determined by the size of the memory device, the length of the cache line and the capabilities of the external and internal busses. The BAG decision and options are further discussed with reference to FIG. 6 below.

Figure 3:
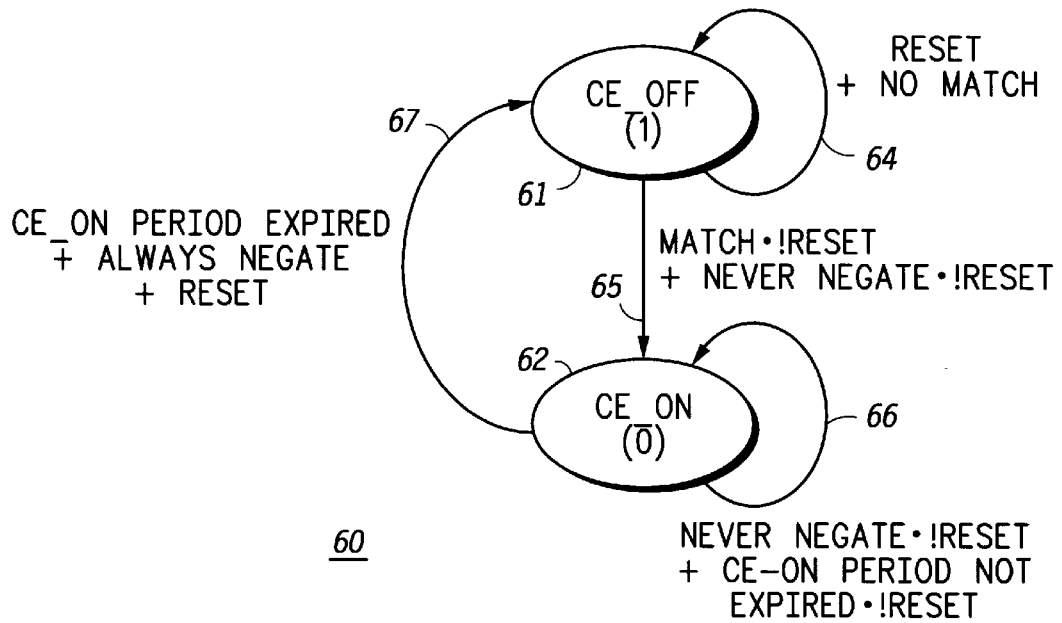
FIG. 3 illustrates a state diagram of the HPCE state machine of FIG. 2.

FIG. 3 illustrates a state diagram of HPCE state machine 60 of FIG. 2. HPCE state machine 60 is capable of assuming one of two states 61 and 62. Associated with states 61 and 62 are state transitions 64, 65, 66, and 67. State 61 is labeled "CE_OFF" and represents the condition in which the chip enable associated with the region is to be inactive. HPCE state machine 60 remains in state 61 as long as there is no match or whenever there is a reset, which is represented by state transition 64. HPCE state machine 60 transitions to state 62, which is labeled "CE_ON", whenever there is a match to the region while reset is inactive, or if the option register 1 indicates that the CE signal is never to be negated and reset is inactive, and is represented by state transition 65. Chip select circuit 40 keeps the chip enable signal active continuously as long as HPCE state machine 60 remains in state 62. This condition is represented by state transition 66 which occurs if either one of two conditions is true: first, if option register 52 indicates that the chip enable signal is never to be negated (HPCE=11) when reset is inactive; or second, if the period indicated by option register 52 of either four (HPCE=00) or eight (HPCE=01) bus cycles has not expired and reset is inactive. Note that four or eight periods was implemented in the present embodiment because only two bits were available to encode different conditions, however in other embodiments additional choices may be available.

HPCE state machine 60 returns to CE_OFF state 61 when any one of three conditions occurs: first, if a timer associated with the CE_ON period has expired; second, if option register 52 indicates that CE should always be negated (HPCE=10); or third, if a reset occurs. Note that HPCE state machine 60 may be implemented with conventional logic circuitry as is well known in the art. However note that a separate hardware timer to count the number of cycles that have elapsed since the last access to the region is preferred. In this case while in state 62, HPCE state machine 60 will decrement the timer once every cycle is started and will reload the counter every time there is a match to the region associated with HPCE state machine 60.

Figure 4:
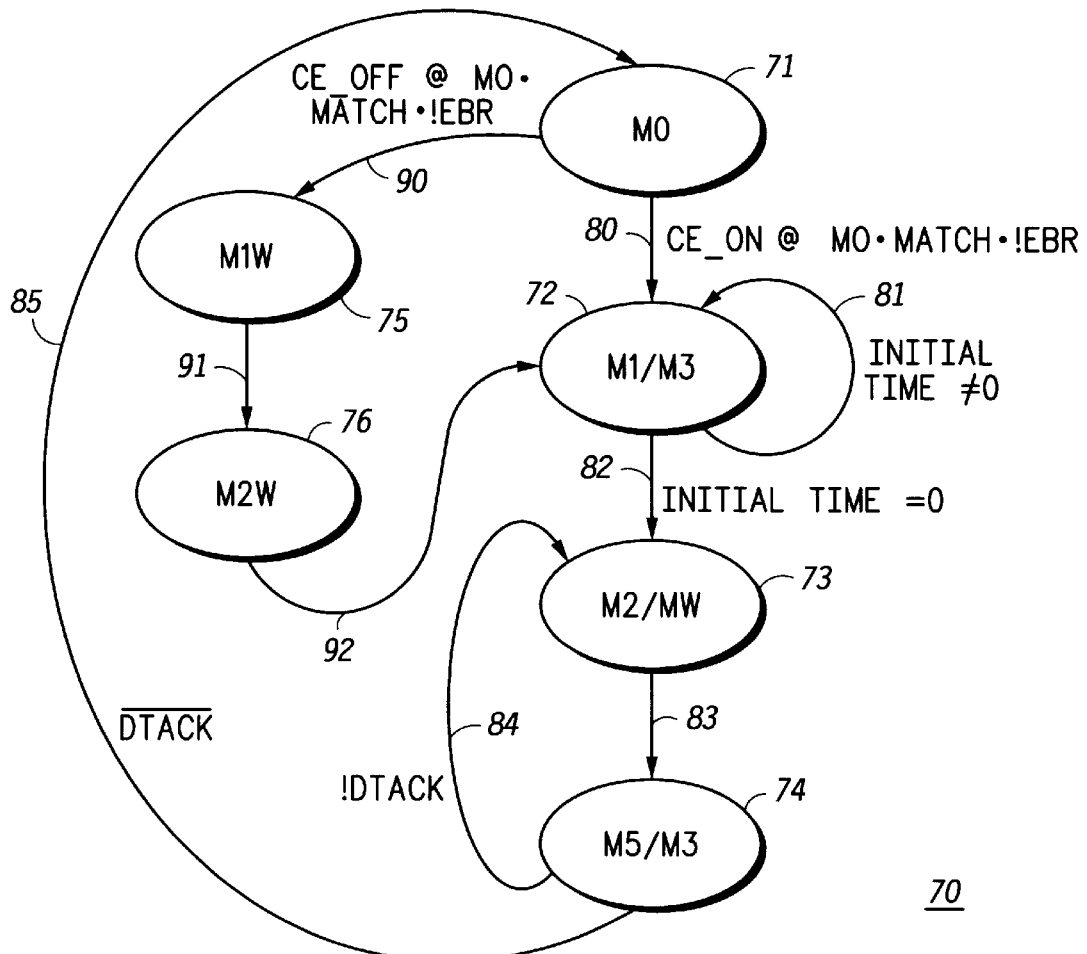
FIG. 4 illustrates a state diagram of the BCS state machine of FIG. 2.

FIG. 4 illustrates a state diagram associated with BCS state machine 70 and includes states 71–76 and state transitions 80–85 and 90–92. State 71 is labeled "M0" and represents the idle state of BCS state machine 70. Note that in state MO 71 if HPCE state machine 60 is in CE_ON state 62, then BCS state machine 70 activates signal LBA upon the occurrence of the beginning of an access cycle. Note that BCS state machine 70 remains in M0 state 71 as long as there is no address match to the region. BCS state machine 70 also remains in M0 state 71 if it recognizes an external bus request, labeled "EBR". BCS state machine 70 leaves M0 state 71 when it recognizes an address match. If HPCE state machine 60 was in CE_ON state 62 while BCS state machine 70 was in M0 state 71 when a match is detected and if there is no external bus request, then BCS state machine 70 makes transition 80 into state 72 which is labeled "M1/M3". M1/M3 State 72 starts the memory access without a delay in activating signal HPCE.

Note that if HPCE state machine 60 is in CE_OFF state 61 while BCS state machine 70 is in state M0 71, a match occurs, and no external device is requesting the bus, BCS state machine 70 makes transition 90 into a state 75 labeled "M1W", and further makes transition 91 into a state 76 labeled "M2W" in order to initially power up the memory through the activation of signal HPCE before the access begins. In M1W state 75, signal LBA is activated and a transition 90 to M1W state 75 corresponds to HPCE state machine 60 making transition 65. An additional half clock period occurs through transition 91 into M2W state 76, which then transitions through state transition 92 into M1/M3 state 72.

Once in M1/M3 state 72, the memory access proceeds in a conventional fashion. BCS state machine 70 remains in M1/M3 state 72 while initial wait states are expiring for a minimum bus cycle time. BCS state machine 70 remains in M1/M3 state 72 for a minimum of one-half clock period, but may remain in M1/M3 state 72 for additional wait states, represented by transition 81. BCS state machine 70 makes transition 82 into a state 73 labeled "M2/MW" to begin a data phase of the transfer. In M2/MW state 73, BCS state machine 70 activates signals BTACK and BAA. Note that signal BTACK is provided to internal bus 36 to recognize the termination of one segment or "beat" of the burst. Note that the BURST DATA TIMING bit in option register 52 determines whether there are wait states during the data phase of the burst transfer and if the BURST DATA TIMING bit is set, signals BTACK and BAA are only activated only every other clock cycle.

BCS state machine 70 makes transition 83 into a state 74 labeled "M5/M3" at the expiration of the prescribed number of wait states before the data transfer and in M5/M3 state 74, the data is actually transferred. If there are additional beats of data remaining in the burst then BCS state machine 70 makes transition 84 back into state 73. At the end of the burst, BCS state machine 70 makes transition 85 back into M0 state 71 and activates signal DTACK to internal bus 36.

Figure 5:
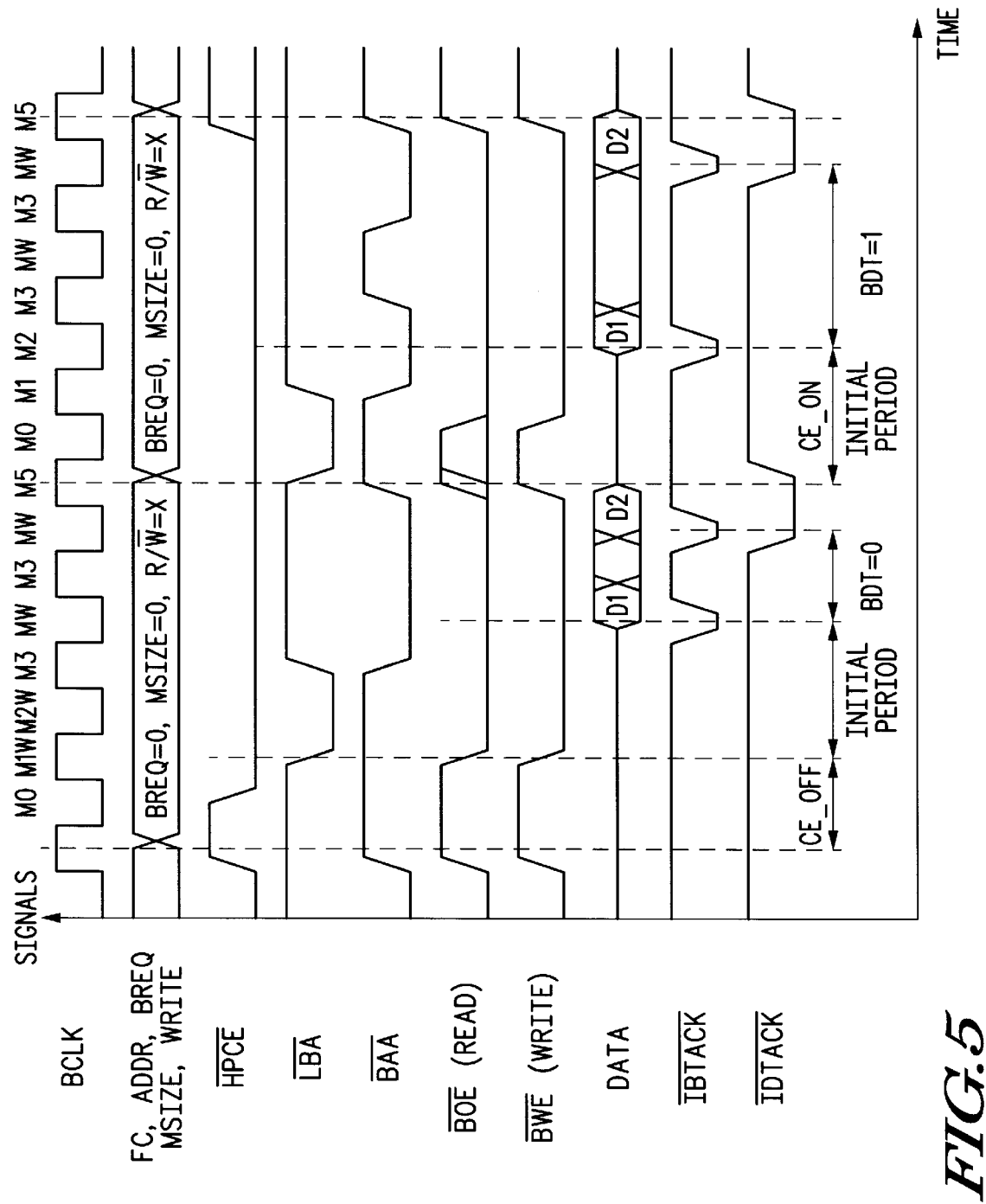
FIG. 5 illustrates a timing diagram useful in understanding the operation of the first portion of the chip select circuit of FIG. 2.

FIG. 5 illustrates a timing diagram associated with burst state machine 54. Shown in FIG. 5 are several signals important to understanding the present invention, including signals HPCE and LBA. Other signals illustrated in FIG. 5 are the bus dock signal BCLK; function code signals labelled "FC"; address signals labelled "ADDR"; a bus request signal labelled "BREQ"; the MSIZE bit of option register 52; a read/write signal labelled "R/W"; signal BAA; an output enable signal labelled "BOE"; a write enable signal labelled "BWE"; a set of 16 data signals labelled "DATA"; an internally-latched data transfer acknowledge signal labelled "IDTACK"; and an internally-latched burst segment termination signal labelled "IBTACK". The operation of most of these signals is conventional and only signals relevant to the present invention will be discussed further.

Note that in FIG. 5 states of the burst clock BCLK correspond to states in BCS state machine 70. FIG. 5 illustrates two consecutive burst accesses. During a first of the two burst accesses, HPCE state machine 60 is in CE$_{OFF}$ state 61, and during the second of the burst accesses HPCE state machine 60 is in CE_ON state 62.

Thus FIG. 5 illustrates the differences which are reflected in state machines 60 and 70 due to the difference of whether CE_ON or CE_OFF is indicated. Note that during the first access corresponding to CE_OFF, signal LBA is activated during M1W, which corresponds to states 75 and 76 of FIG. 4. However, note that during the second burst access, there are no states corresponding to states 75 and 76 and thus signal LBA is activated during M0 state 71.

During the second access, signal LBA is activated speculatively because HPCE state machine 60 was already in state 62 corresponding to CE_ON. Occasionally the access will not be to the region so that signal LBA will not be needed. However the speculative activation of signal LBA improves the cycle time of the second access by one full clock cycle, thus improving performance of the system by removing a wait state from the system which was used to power the memory up.

Note that in the illustrated embodiment, HPCE state machine 60 was used as the mechanism to decide whether to speculatively activate signal LBA. However in other embodiments, other mechanisms which are based on the history of accesses to the region may be used. For example, another mechanism could use the relative frequency of accesses to the region to predict the likelihood of a next access to the region, in a manner similar to branch prediction used in high performance microprocessors.

Figure 6:
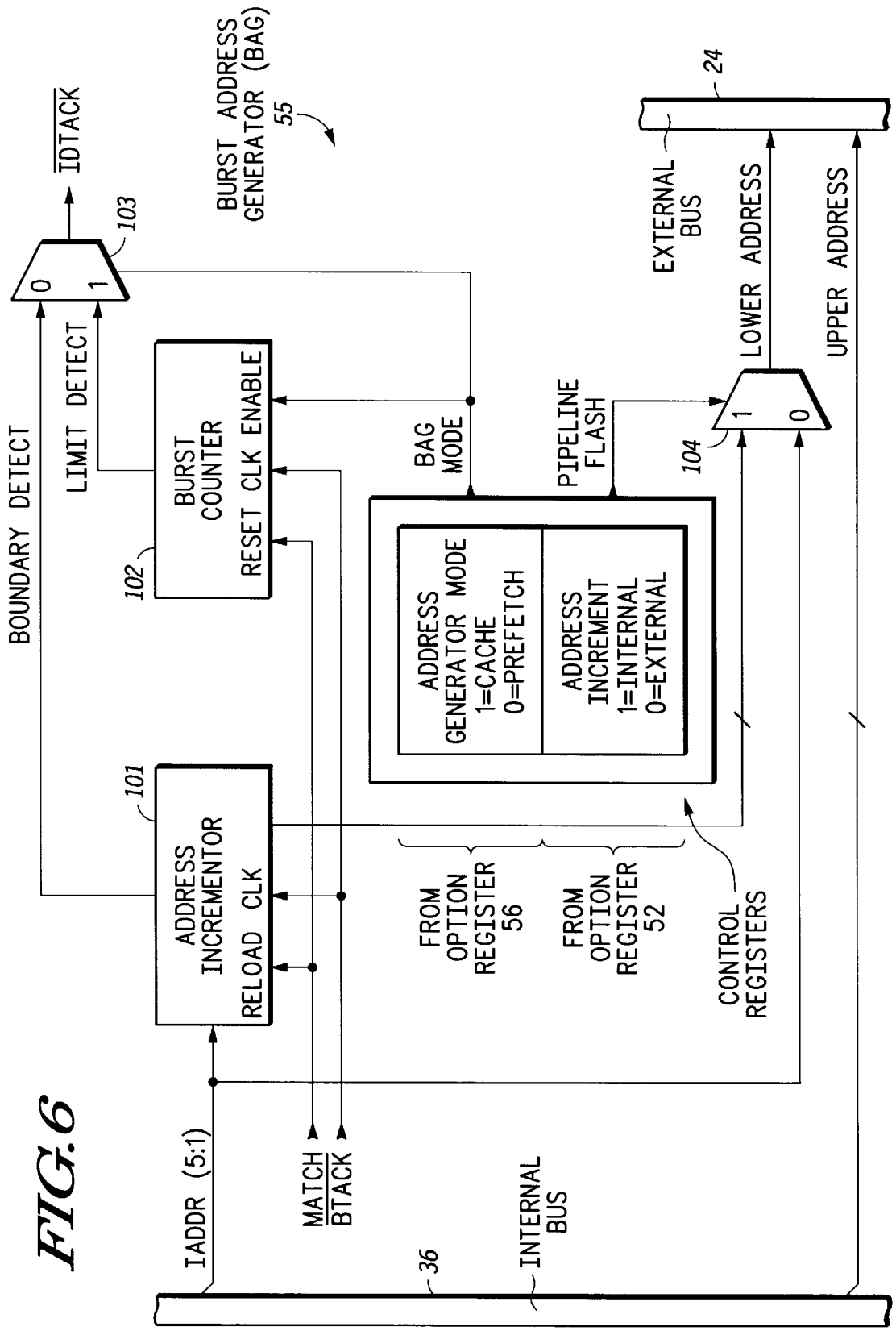
FIG. 6 illustrates in partial block form and partial logic diagram form the burst address generator of FIG. 2.

Referring to FIG. 6, Burst Address Generator (BAG) 55, is made up of two modulo counters, address incrementor 101, and burst counter 102, and is coupled to internal bus 36, MUX 103, and MUX 104. Address incrementor 101 receives a MATCH signal and an initial address on a portion of internal bus 36 labeled IADDR (5:1). Address incrementor 101 also receives a BTACK signal which is used to increment the address stored in address incrementor 101. When address incrementor 101 indicates a memory boundary (e.g. end of memory row) a BOUNDARY DETECT signal is provided to Multiplexer (MUX) 103.

BAG 55 has logic to control MUX 104 to output the burst address on the external bus 24. BAG 55 generates each individual burst address during a burst cycle, and terminates the burst cycle based on the architectural requirements. BAG 55 latches the starting burst address in address incrementor 101 and increments the burst address by one word or one increment IADDR (1) every time BTACK is asserted. By providing the burst address (e.g. burst portion of the address or IADDR (5:1)) on external bus 24, burst devices requiring an incremented burst address for every data transfer are satisfied.

To facilitate the address provision, MUX 104 is supplied a burst start address from IADDR (5:1) and an incremented burst address from address incrementor 101. The option register 52 MEMORY TYPE selection of PIPELINE FLASH indicates whether to provide the incremented address or the burst start address to the external address bus 24. The PIPELINE FLASH information is provided to MUX 104 and selects between generation of continuous burst start address or incremented burst address to external bus 24. Alternate embodiments are available for determining external address provision based on system requirements, such as signals from the data processor, control register state, or signals from external devices. Note that alternate embodiments may have various lengths of significant burst address and that the amount of data information provided may be predetermined or programmable. Note that the upper portion of address bits is provided to external bus 24.

Termination of burst cycle in BAG 55 is based on either the physical address reached in address incrementor 101 or the number of burst transfers counted in burst counter 102. In pre-fetch mode operation (BAG MODE=0) if the burst cycle accesses memory location ($2^N-1$) the bus cycle terminates by internal assertion of DTACK signal. Note that such an assertion of DTACK signal restarts burst operation on the next bus cycle starting at address $2^N$. In one embodiment of the present invention, for burst devices with no physical boundary restrictions, this field is programmed to select the burst length according to TABLE I, where the burst cycle is terminated after the number of data transfers indicated by DEVICE BOUNDARY bits.

In cache mode operation (BAG MODE=1) the BAG terminates the burst transaction on the $2^N$ data transfer without regard to the burst address. The MATCH signal and the BTACK signal are both also supplied to a burst counter 102. The BAG MODE bit indicates the type of transaction to be performed, either cache type or pre-fetch type. Assertion of the BAG MODE bit in option register 56 indicates a cache access to burst counter 102 and to MUX 103. In response to the MATCH signal, burst counter 102 initializes and counts to a predetermined number of data transfers, which is determined by the cache line size. The burst counter 102 indicates that data transfers have completed for one line of cache by a LIMIT DETECT signal to MUX 103. Note that MUX 103 generates IDATCK signal for both BOUNDARY DETECT for prefetch mode and LIMIT DETECT for cache mode, where BAG MODE bit indicates the transaction mode. For cache mode transactions, BAG MODE bit also enables burst counter 102.

Figure 7:
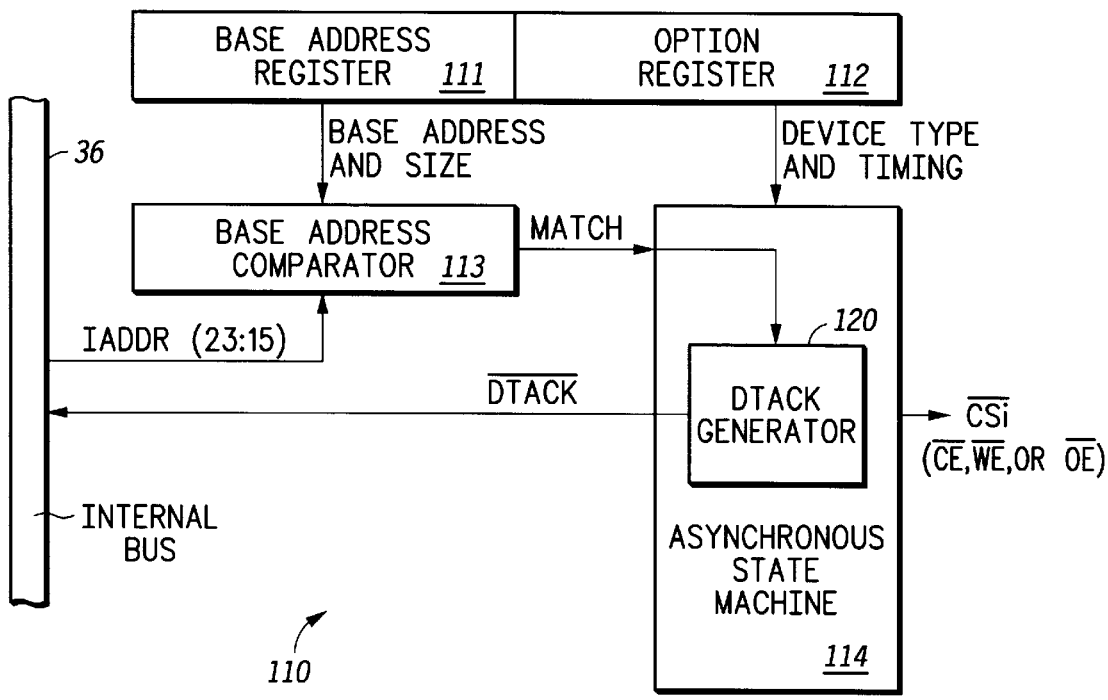
FIG. 7 illustrates a block diagram of a second portion of the chip select circuit of FIG. 1.

FIG. 7 illustrates in block diagram form a second portion 110 of chip select circuit 40 of FIG. 1. Portion 110 includes generally base address register 111, an option register 112, a base address comparator 113, and an asynchronous state machine 114. Base address register 111 stores bits including a base address and size of the region associated with portion 110 and provides them as an input to base address comparator 113. Base address comparator 113 also has a second input for receiving critical bits of the address conducted on the internal bus 36 labeled IADDR (23:15). Base address comparator 113 activates an output labeled "MATCH" which indicates that the address represented by critical address bits IADDR (23:15) are within the range defined in base address register 111.

Option register 112 includes several bits defining programmable characteristics associated with the region. The definition of these bits is illustrated in TABLE III below.

TABLE III

| Bit(s) | Name | Encoding |
| --- | --- | --- |
| 3:0 | DTACK (WAITS) | 0000–1110 = 0–14 wait states |
| | | 1111 = external termination |
| 4 | STRB | 0 = CE |
| | | 1 = DS |
| 5 | SIPL | 0 = no IPL checking |
| | | 1 = only match assigned IPL |
| 6 | RSVD | Reserved. |
| 7 | NEGATE EARLY | 0 = negate CS in S5 |
| | | 1 = negate CS one clock before cycle ends |
| 9:8 | Prog/Data | 00 = data or program |
| | | 01 = data space |
| | | 10 = program space |
| | | 11 = reserved |
| 11:10 | SPACE | 00 = CPU space |
| | | 01 = user space |
| | | 10 = supervisor space |
| | | 11 = supervisor or user space |

TABLE III-continued

| Bit(s) | Name | Encoding |
|---|---|---|
| 13:12 | R/W | 00= chip select disabled<br>01 = read only<br>10 = write only<br>11 = both |
| 15:14 | PSIZ | 00 = 8-bit port<br>01 = 16-bit port, lower byte<br>10 = 16-bit port, upper byte<br>11 = 16-bit port, both bytes |

Asynchronous state machine 114 is an access state machine which upon a match to the region associated with portion 110 generates a chip select output signal labeled "CSi". This chip select output signal may be programmed to be either CE, WE, or OE by appropriately setting the STRB and R/W bits in option register 112. Asynchronous state machine 114 includes a DTACK generator circuit 120 which terminates the access cycle by providing signal IDTACK to internal bus 36. DTACK generator circuit 120 receives signal MATCH and generates signal IDTACK based on the number of cycles programmed for the DTACK field of option register 112.

Figure 8:
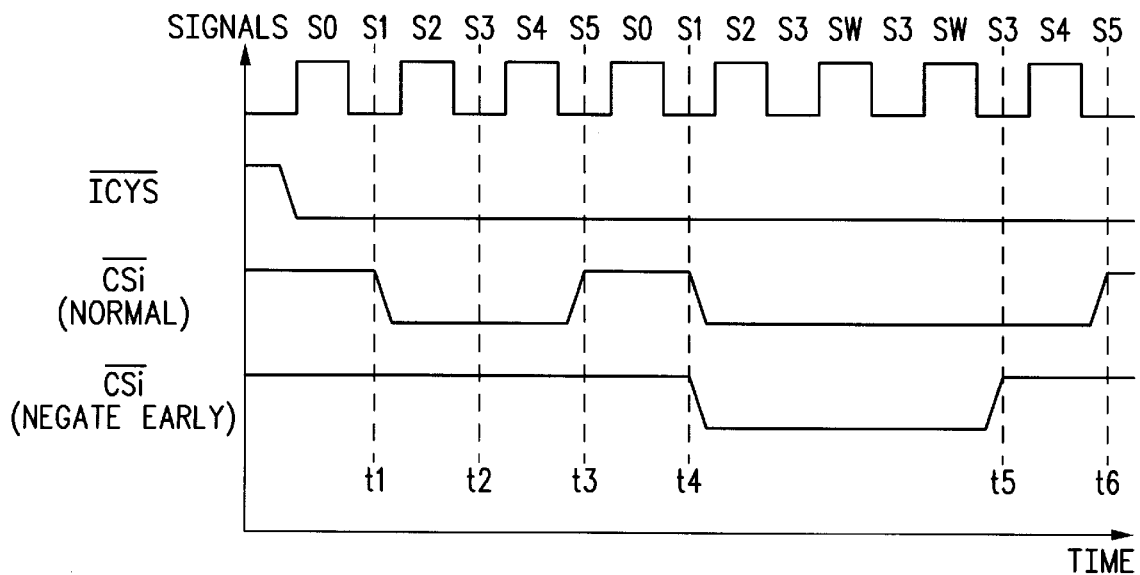
FIG. 8 illustrates a timing diagram useful in understanding the operation of the second portion of the chip select circuit of FIG. 2.

According to one aspect of the present invention, asynchronous state machine 114 selectably negates signal CSi early in the cycle if the NEGATE EARLY bit is set in option register 112. This aspect is better understood with reference to FIG. 8, which illustrates a timing diagram of a bus cycle. Shown in FIG. 8 are six half clock periods which form three full clock periods of a minimum-length bus cycle, labeled "S0", "S1", "S2", "S3", "S4", and "S5". The cycle begins when CPU 32 activates signal ICYS one half clock before S0. In response, signal CSi may be activated during period S1 at a time point labeled "t1" if the STRB bit in option register 112 indicates that signal CSi should be activated synchronously with the address strobe signal. During "normal" operation, in which the NEGATE EARLY is set to 0, signal CSi is deactivated at the end of the bus cycle in state S5 at a time labeled "t3". This "normal" operation is shown by the deactivation of signal CSi at time point t3 (state S5) during one cycle in which there are no wait states, and at time point t6 (state S5) during another cycle in which there are two wait states.

However, when so defined in option register 112 by the NEGATE EARLY bit being set to 1, signal CSi is deactivated one clock period early, in state S3. Note that signal CSi will only be deactivated early if the number of wait states is equal to one or more, and the bus cycle terminates normally (i.e., cycle terminates without either a bus error or another block returning signal DTACK before portion 110). Thus FIG. 8 only illustrates the early inactivation of signal CSi during the second access, in which there are two wait states. In this access, signal CSi negates at time point t5, also during state S3. The number of wait states inserted does not affect the bus state at which signal CSi negates early (S3); signal CSi remains asserted throughout the wait period and then negates one clock cycle prior to the final clock cycle.

In one aspect of the present invention, a method for accessing memory includes the steps of detecting a start of an memory access; predicting whether the memory access will be to a predetermined region; activating a first chip select signal if the memory access is predicted to be to the predetermined region; examining an address of the memory access to determine whether the memory access is in fact to the predetermined region; if the memory access is determined to be to the predetermined region based on the step of examining, completing the memory access by activating a second chip select signal; and if the memory access is determined to be to a second region other than the predetermined region, terminating the memory access to the predetermined region by keeping the second chip select signal inactive.

While the invention has been described in the context of a preferred embodiment, it will be apparent to those skilled in the art that the present invention may be modified in numerous ways and may assume many embodiments other than that specifically set out and described above. For example, the mechanism used to speculatively determine whether to activate signal LBA and keep the chip enable signal active may vary from embodiment to embodiment. Accordingly, it is intended by the appended claims to cover all modifications of the invention which fall within the true spirit and scope of the invention.

We claim:

1. A method for accessing memory comprising the steps of:

detecting a first access to a first region of memory and activating a chip select signal during said first access in response;

keeping said chip select signal active for a predetermined number of second accesses after said first access, wherein each of said predetermined number of second accesses is to a different region from said first region;

deactivating said chip select signal in response to a third access to said different region wherein said third access occurs immediately after said predetermined number of second accesses; and storing a value which defines said predetermined number.

2. The method of claim 1 wherein the step of keeping further comprises the step of starting to count said second predetermined number of accesses again in response to an access to said first region before an occurrence of said third access.

3. The method of claim 1 wherein said step of detecting further comprises the step of detecting said first access to said first region of memory and activating a chip enable signal during said first access in response.

4. The method of claim 1 wherein said step of detecting further comprises the step of detecting said first access to said first region of memory and activating a device cycle start signal during said first access in response.

5. The method of claim 1 wherein said step of detecting comprises the steps of:

storing a value defining a range of addresses in said first region;

receiving an address; and comparing said address to said range of addresses and detecting said first access if said address is within said range of addresses.

6. The method of claim 1 wherein said predetermined number is a selected one of four or eight.

7. A method for accessing memory comprising the steps of:

storing a value representative of a predetermined number of second accesses in an option register;

detecting a first access to a first region of memory and activating a chip select signal during said first access in response;

keeping said chip select signal active for a predetermined number of second accesses after said first access, wherein each of said predetermined number of second accesses is to a different region from said first region; and deactivating said chip select signal in response to a third access to said different region wherein said third access occurs immediately after said predetermined number of second accesses.

8. The method of claim 7 wherein the step of keeping further comprises the step of starting to count said second predetermined number of accesses again in response to an access to said first region before an occurrence of said third access.

9. The method of claim 7 wherein said step of detecting further comprises the step detecting said first access to said first region of memory and activating a chip enable signal during said first access in response.

10. The method of claim 7 wherein said step of detecting further comprises the step detecting said first access to said first region of memory and activating a device cycle start signal during said first access in response.

11. The method of claim 7 wherein said step of detecting comprises the steps of:

storing a value defining a range of addresses in said first region;

receiving an address; and comparing said address to said range of addresses and detecting said first access if said address is within said range of addresses.

12. The method of claim 7 wherein said predetermined number is a selected one of four or eight.

13. A method for accessing memory comprising the steps of:

detecting a start of an memory access;

predicting whether said memory access will be to a predetermined region;

activating a first chip select signal if said memory access is predicted to be to said predetermined region; and examining an address of said memory access to determine whether said memory access is in fact to said predetermined region;

if said memory access is determined to be to said predetermined region based on said step of examining, completing said memory access by activating a second chip select signal; and if said memory access is determined to be to a second region other than said predetermined region, terminating said memory access to said predetermined region by keeping said second chip select signal inactive.

14. The method of claim 13 wherein said step of predicting comprises the step predicting whether said memory access will be to said predetermined region based on a history of accesses.

15. The method of claim 14 wherein said step of predicting comprises the step of determining whether there has been an access to said predetermined region within a predetermined number of accesses.

16. The method of claim 15 further comprising the step of storing a value which defines said predetermined number.

17. The method of claim 16 wherein said predetermined number is a selected one of or eight.

18. The method of claim 13 wherein said step of speculatively activating said first chip select signal comprises the step of speculatively activating a chip enable signal.

19. The method of claim 13 wherein said step of speculatively activating said first chip select signal comprises the step of speculatively activating a device cycle start signal.

20. A method for accessing memory comprising the steps of:

selecting a first number of access cycles, wherein the first number of access cycles is a non-zero number;

detecting a first access to a first region of memory and activating a chip select signal during said first access in response;

keeping said chip select signal active for the first number of access cycles after said first access, wherein each of the first number of access cycles is to a different region from said first region; and deactivating said chip select signal in response to a third access to said different region wherein said third access occurs immediately after the first number of access cycles.

* * * * *